C. ALLEN.
SETTLING TANK.
APPLICATION FILED FEB. 18, 1920.
1,406,323.
Patented Feb. 14, 1922.
2 SHEETS—SHEET 1.
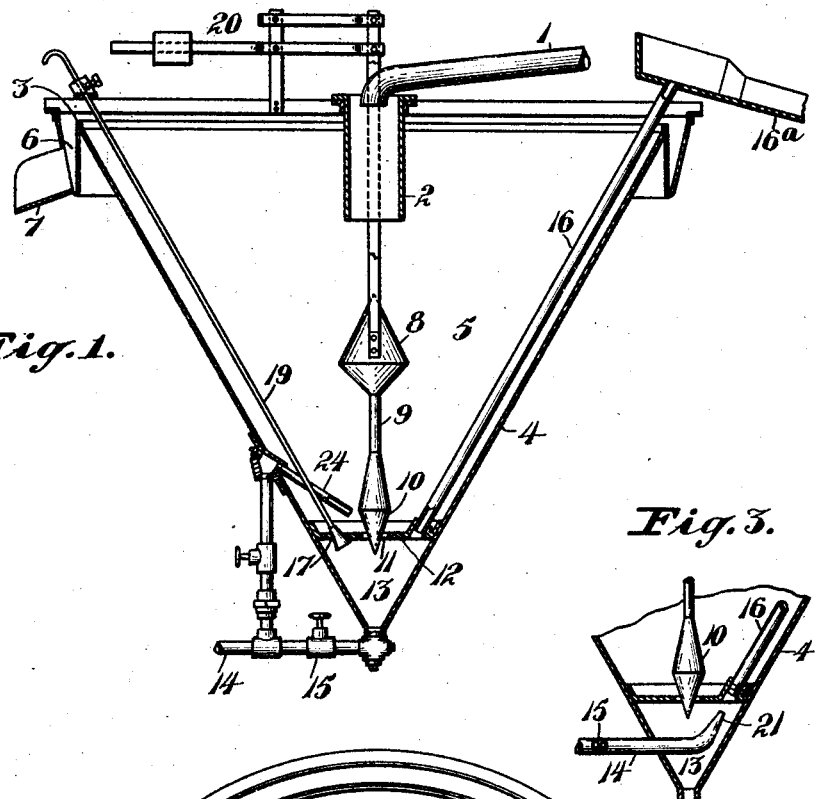
INVENTOR
Charles Allen
BY Chas. E Townsend
ATTORNEY

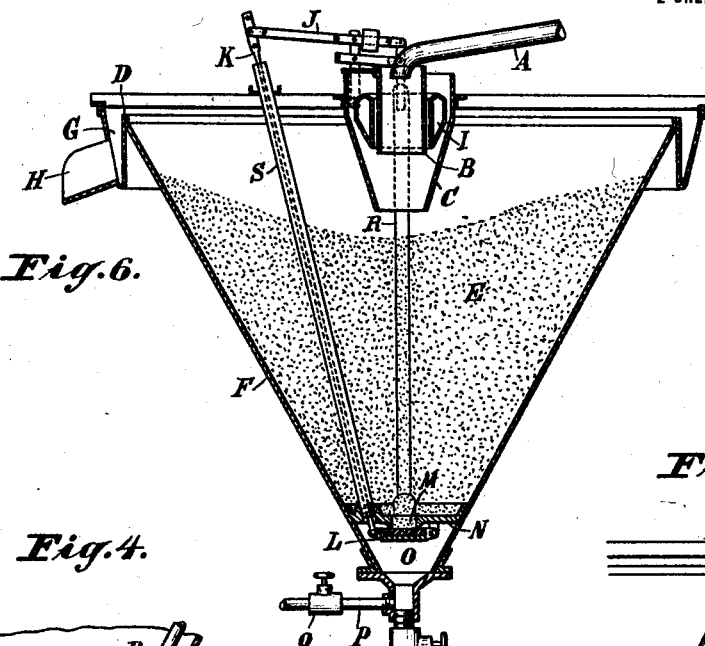
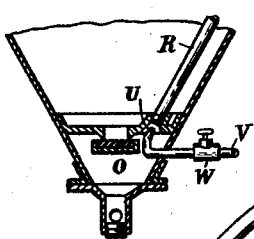
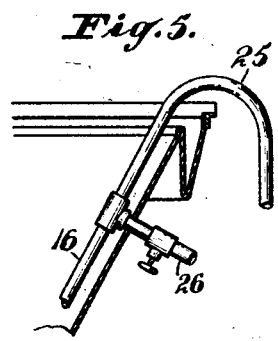
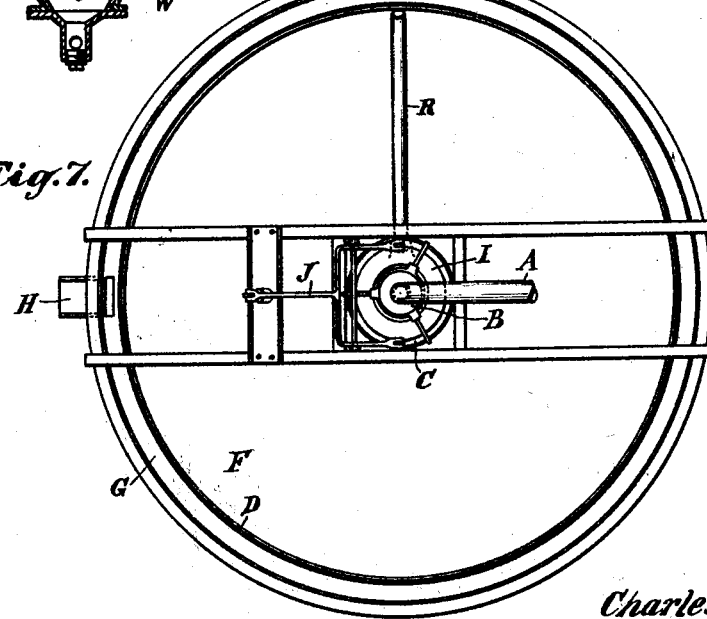

UNITED STATES PATENT OFFICE.

CHARLES ALLEN, OF EL PASO, TEXAS.

SETTLING TANK.

1,406,323.　　　　Specification of Letters Patent.　　Patented Feb. 14, 1922.

Application filed February 18, 1920. Serial No. 359,830.

*To all whom it may concern:*

Be it known that CHARLES ALLEN, a citizen of the United States, residing at El Paso, in the county of El Paso and State of Texas, has invented a new and useful Improvement in Settling Tanks, of which the following is a specification.

This invention relates to settling tanks for classifying thickening or separating solids suspended in liquid. These tanks are usually cone-shaped with the apex at the bottom fitted with a valve-controlled discharge orifice. A feed stream continuously enters at the top and the settled solids accumulated in the bottom of the tank, upon reaching the required density, automatically actuate the valve through suitable float mechanism whereby to open the discharge orifice and permit the accumulated solids to pass out, the lighter product meantime overflowing the rim of the tank. There are various ways of actuating the valve, two such being shown and described herein.

The object of the present invention is to provide a classifier, settler, or thickener in which the classified, settled or thickened product is elevated before its discharge from the device by the use of the effect of a difference in density between the material within the tank undergoing treatment and that in a discharge pipe which has passed through the tank.

Referring to the accompanying drawings:—

Fig. 1 shows a vertical central sectional view of one form of tank embodying my invention.

Fig. 2 shows a plan view of the same.

Fig. 3 shows a detail sectional view illustrating a modified arrangement wherein a jet action is given to the water pipe in the bottom of the tank.

Fig. 4 shows a detail sectional view of a modified arrangement wherein an airpipe has been substituted for the water pipe of Fig. 3.

Fig. 5 shows a detail sectional view of the upper portion of the tank of Fig. 1 illustrating a siphon-like arrangement of the discharge pipe.

Fig. 6 shows a vertical central sectional view of a complete tank illustrating a different arrangement of parts from that shown in Fig. 1.

Fig. 7 shows a plan view of the device illustrated in Fig. 6.

Referring in detail to the device shown in Figs. 1 and 2, I show a cone-shaped settling tank 4 having a centrally arranged feed spout 2 into which material enters from a feed pipe 1. The tank has an overflow lip 3 surrounding which is a launder 6, the latter having a discharge spout 7. On the interior of the tank I arrange a float 8 connected by stem 9 with a valve 10, said valve serving to control an orifice 11 formed in a diaphragm 12 near the bottom of the tank. This diaphragm 12 divides the interior of the tank into an upper compartment 5 and a lower compartment 13. The buoyancy of the float is regulated by a system of weights and levers 20. Communicating with the lower compartment 13 and extending upwardly within the tank at one side thereof is a discharge pipe 16 which in Fig. 1 discharges into a spout 16ª at the top of the tank and in Fig. 5 is shown as being provided with a bent end 25, passing over the top of the tank and extending downwardly therefrom. The water pipe 14 controlled by valve 15 opens into the lower compartment 13 and as shown in Fig. 3 this pipe 14 may have a nozzle 21 at its discharge end to give a jet effect to the water issuing therefrom, said nozzle being arranged in close proximity with the lower end of the discharge pipe 16. In Fig. 4 I omit the water pipe 14 and substitute therefor an airpipe V controlled by valve W and having a nozzle U arranged near the lower end of the discharge pipe.

In Fig. 6, I show a similar tank F formed with an overflow lip D and launder G. The material is introduced thereto through a pipe A and inlet spout B. Around the spout B is a float I arranged within a chamber C. The discharge orifice for the settled material is indicated by the letter M, being formed in a diaphragm N and controlled by a valve L. The upper part of the interior of the tank is indicated by the letter E and the lower part by the letter O. For operatively connecting the float I with the valve L, I show a lever J and a link K, the latter extending downwardly through the tank and being carried in a sleeve S. The discharge pipe for the settled material is indicated by the letter R and the water pipe for introducing water into the compartment O is indicated by the letter P controlled by valve Q.

In the operation of the device shown in

Fig. 1 the feed stream discharging from the feed pipe I enters the inlet spout 2 and after passing through it the feed stream water and the solid particles carried with it, or by it pass over the overflow lip 3 into the launder 6 and escape by means of the spout 7. The solid particles that are not discharged over the lip 3 settle in compartment 5 of the cone 4 thereby increasing the density of the contents of 5 until its density is so increased that the actuating member 8 and its immersed attachments displace a less weight than an equal volume of the material in which they are immersed. The actuating member 8 then rises carrying with it the valve 10 thereby opening the orifice 11 and permitting the passage of material from compartment 5 into compartment 13.

The material that passes through the orifice 11 into compartment 13 meets the water entering 13 from the valve controlled pipe 14 and with it enters and is discharged through the pipe 16. When the conditions call for it the pipe 16 discharges at a higher level than the overflow lip 3 of compartment 5. The discharge pipe 16 as shown by Fig. 1 is not the column of a hydraulic jet ejector. There is no jet effect to the water entering pipe 16, the flow through it (with the orifice 11 open) is due to the contents of the pipe 16 being of less density than the contents of compartment 5. As an illustration of the practical use of this difference in density I submit the following:

A difference of 0.01 in density will cause a difference of 0.01 in the height of the respective columns. Assume the vertical height of the material in compartment 5 to be 120 inches and its density to be 1.33; the vertical height of the material occupying pipe 16 to be the same, 120 inches, and its density to be 1.11, 1.33 minus 1.11 equals 0.22 the difference in density 0.22×120 equals 26.4. Hence when the pipe 16 is discharging level with the overflow of compartment 5, there is a velocity head of 26.4 inches to the flow through the pipe and when the pipe 16 is discharging 14.4 inches above the overflow of 5, there remains an available velocity head of 12 inches, theoretically sufficient to cause a flow of 96 inches per second. With the orifice 11 closed the available velocity head to the flow is the velocity head to the water entering 13 from the pipe 14 and as the orifice 11 is closed whenever the contents of compartment 5 become of less than a predetermined density the discharge from compartment 13 is always through the pipe 16.

To discharge the material from compartment 13 at a greater height than could be attained by the use of the difference in densities the water entering 13 can be conducted to the bottom of the pipe 16 and there issue as a jet, the jet and pipe forming a jet ejector, (Fig. 3) or air can be admitted into compartment 13 as shown by Fig. 4 thereby converting the pipe 16 into the column of an air lift. In that connection it is to be noted that when an air lift is used the thickened material entering compartment 13 from compartment 5 may be discharged by the air lift without dilution. An air lift will discharge thick material and the device will function when the valve 15 is completely closed.

When mill conditions permit that the discharge pipe from 13 discharges below the level of the overflow lip 3 the discharge pipe may be a siphon passing over the overflow lip and discharging below it as shown by 25 Fig. 5, and due to the difference in densities the siphon will be a self starter when the orifice 11 in the diaphragm 12 is open, or the discharge pipe may pass through the side of compartment 5 as shown by 26 Fig. 5. In either case the velocity head to the flow through the pipe is greater than when it is discharging above the level of the overflow lip 3. However, the increased velocity head to the flow through the pipe has no effect on the contents of compartment 5. The discharge pipe from 13 cannot draw off the contents of 5 because the control of orifice 11 is wholly within compartment 5. It is to be remembered that the effect in the difference in density would be present and that with a perfectly uniform feed the device would function if orifice 11 had no valve control whatever.

In order to prevent the packing of solid particles around valve 10 or to loosen them should they so pack as to impede the free movement of the valve, the pipe 24 is provided. Should operations cease with the compartment 5 full of material undergoing treatment it is evident that a mass of material would settle over the diaphragm 12 and that on the resumption of operations the valve 10 might not be free to move. In such an event water issuing from pipe 24 would loosen up the obstructing particles.

Orifice 17 in diaphragm 12 is an auxiliary outlet for the contents of compartment 5. It provides a means of emptying compartment 5 without passing its contents through orifice 11. Normally orifice 17 is closed and it is opened and closed by means of the rod 19.

In the operation shown in Fig. 6 the feed stream discharging from the feed pipe A passes through the inlet spout B and the float container C and on issuing from C the feed stream water and such solid particles as accompany it flow over the overflow lip D into the launder G and are discharged from it by the spout H.

The solid particles that do not pass over the lip D settle and accumulate in compartment E until they obstruct the passage of the feed stream from C into E, thereby causing the water to rise in C carrying with it the actuating float I which by means of the connecting parts J and K remove the valve L from the orifice M a distance proportionate to the rise of the float I. The removal of the valve from the orifice M permits particle settled in compartment E to pass into compartment O and the particles that enter compartment O are carried with or by the water that enters O from the pipe P into and through the discharge pipe R.

The manner in which a difference in density causes an upward flow through the discharge pipe from the lower compartment is described in connection with Fig. 1. In the device shown by Fig. 6 there is in addition to density the weight and inertia of a mass of settled particles resisting an upflow from O through M into E.

As the settled particles in E would prevent the free movement of the link K the conduit S is used. The lower end of S connects with the compartment O, its upper end projecting a sufficient distance above the surface of the contents of E for the proper functioning of the device.

The device shown by Fig. 6 may also be fitted with the water jet of Fig. 3 or the air lift Fig. 4. By the use of the air lift the material entering O from E may be discharged from O through the pipe R without dilution, hence the degree of dilution of the discharge is under control.

Having thus described my invention, what I claim and desire to secure by Letters Patent is:—

1. In a device of the class described, a settling tank for solids suspended in liquid, having a rim overflow for the lighter product and a partition near the bottom dividing the interior of the tank into two compartments, a valve controlled orifice arranged in said partition, a buoyant member within the tank responsive to changes in the density of the material to rise and open the valve when the material in the bottom of the tank reaches a predetermined density whereby to permit the heavier product to pass through said valve controlled orifice into the lower compartment, means to remove the material from said lower compartment, and a second orifice in said partition and a manually operated valve to control same.

2. In a device of the class described, a settling tank for solids suspended in liquid, having a rim overflow for the lighter product and a valve controlled orifice in the bottom for the discharge of the heavier product, a buoyant member within the tank responsive to changes in the density of the material to rise and open the valve when the material in the bottom of the tank reaches a predetermined density, a receptacle below the discharge orifice into which the heavier product passes, a discharge pipe communicating with said lower receptacle and extending upwardly within the tank and over the top thereof, and means to raise the material from the lower receptacle out through the discharge pipe.

3. In a device of the class described, a settling tank for solids suspended in liquid, having a rim overflow for the lighter product and a valve controlled orifice in the bottom for the discharge of the heavier product, a bouyant member within the tank responsive to changes in the density of the material to rise and open the valve when the material in the bottom of the tank reaches a predetermined density, a receptacle below the discharge orifice into which the heavier product passes, and a discharge pipe communicating with said lower receptacle and extending upwardly within the tank and over the top thereof, said discharge pipe terminating below the top of the tank whereby to afford a siphon action to assist in the discharge of material therethrough.

4. In a device of the class described, a settling tank for solids suspended in liquid, having a rim overflow for the lighter product and a valve controlled orifice in the bottom for the discharge of the heavier product, a buoyant member within the tank responsive to changes in the density of the material to rise and open the valve when the material in the bottom of the tank reaches a predetermined density, a receptacle below the discharge orifice into which the heavier product passes, a discharge pipe communicating with said lower receptacle and extending upwardly within the tank and over the top thereof, and means to admit water to the lower receptacle whereby to dilute the material therein sufficiently to cause the same to be raised through the discharge pipe by reason of the greater weight of the overlying mass in the tank.

In testimony whereof I have hereunto set my hand in the presence of two subscribing witnesses.

CHARLES ALLEN.

Witnesses:
EDMUND SHAW,
ARTHUR H. SWETT.